United States Patent
Wang et al.

(10) Patent No.: US 8,553,812 B2
(45) Date of Patent: Oct. 8, 2013

(54) SYNCHRONIZATION STRUCTURE AND METHOD FOR A RECEIVING APPARATUS OF A COMMUNICATION SYSTEM

(75) Inventors: Qi Wang, Esslingen (DE); Zhaocheng Wang, Beijing (CN)

(73) Assignee: Sony Corporation, Tokyo (JP)

( * ) Notice: Subject to any disclaimer, the term of this patent is extended or adjusted under 35 U.S.C. 154(b) by 966 days.

(21) Appl. No.: 12/638,369

(22) Filed: Dec. 15, 2009

(65) Prior Publication Data

US 2010/0226463 A1    Sep. 9, 2010

(30) Foreign Application Priority Data

Mar. 4, 2009  (EP) ..................................... 09154314

(51) Int. Cl.
*H03D 1/00* (2006.01)
*H04L 27/06* (2006.01)

(52) U.S. Cl.
USPC ............................ 375/343; 375/354; 375/366

(58) Field of Classification Search
USPC .................. 375/343, 354, 365–368
See application file for complete search history.

(56) References Cited

U.S. PATENT DOCUMENTS

2004/0202229 A1* 10/2004 Raphaeli et al. ............... 375/145
2007/0036235 A1*  2/2007 Bohnke et al. ................ 375/260

FOREIGN PATENT DOCUMENTS

| EP | 0 915 597 A1 | 5/1999 |
| EP | 1 032 157 A1 | 8/2000 |
| WO | WO 98/10421 | 3/1998 |

* cited by examiner

*Primary Examiner* — Curtis Odom
(74) *Attorney, Agent, or Firm* — Oblon, Spivak, McClelland, Maier & Neustadt, L.L.P.

(57) ABSTRACT

Discussed herein is a synchronization structure for a receiving apparatus for receiving signals in a communication system, in which the signals are transmitted in frames, each frame comprising a synchronization part with synchronization sequences, wherein at least one of the synchronization sequences has a different phase than the other synchronization sequences. The synchronization structure includes a correlation unit configured to perform a correlation on the synchronization part, a peak detection unit configured to detect candidate correlation peaks and the correlation result, and a correlation peak detection unit configured to detect a correlation peak among said candidate correlation peaks on the basis of a confidence value and phase information. Further, a corresponding synchronization method that enables frame synchronization with a higher performance in low signal to noise ratio environments is also discussed.

13 Claims, 5 Drawing Sheets

SYNCHRONIZATION STRUCTURE AND METHOD FOR A RECEIVING APPARATUS OF A COMMUNICATION SYSTEM

The present invention relates to a synchronization structure and method for a receiving apparatus for receiving signals in a communication system.

The present invention particularly relates to burst or packet type communication systems in which the data content is transmitted on the basis of a temporal frame structure, wherein each frame comprises a preamble or training sequence enabling a receiving apparatus to detect and determine the beginning of the frame so that the data content (and eventually channel estimation sequences and the like) can be detected and processed properly in the receiving apparatus. Typically, a preamble or training sequence comprises at least two or more synchronization sequences, each synchronization sequence comprises the same number of symbols (or samples). Typically, the synchronization sequences are identical, i.e. have the same synchronization content, whereby one or more of the synchronization sequences are phase inverted in relation to the other synchronization sequences. In a receiving apparatus, the preamble or training sequence comprising the synchronization sequences is processed in a suitable manner to detect a synchronization peak enabling the determination of the beginning of the frame. The beginning of the frame is hereby the beginning of a succeeding channel estimation sequence, the beginning of a succeeding data block or the like. Typically, the synchronization sequences are hereby processed in a receiving apparatus by an auto-correlation, i.e. a correlation of the received synchronization sequences with itself, which achieves a coarse synchronization in a receiving apparatus. The accuracy of such a coarse synchronization usually has to be enhanced in combination with other approaches, such as cross-correlation or maximum likelihood detection or the like. In some communication systems, the preamble or training sequence is also used for an automatic gain control. However, at the beginning of the synchronization sequences, the automatic gain control is not properly adjusted, which can lead to a decrease in the accuracy, particularly in cases where the signal to noise ratio is low and/or channel conditions are not good. Further, for some communication systems, for example for single carrier wireless communication systems, a rather accurate frame synchronization is necessary since the succeeding channel estimation needs more accurate and reliable timing than other communication systems.

The object of the present invention is therefore to provide a synchronization structure and a synchronization method for a receiving apparatus for receiving signals in a communication system with an improved performance.

The above object is achieved by the synchronization structure according to claim 1 and a synchronization method according to claim 8.

The present invention suggests a synchronization structure for a receiving apparatus for receiving signals in a communication system, in which the signals are transmitted in frames, each frame comprising the synchronization part with synchronization sequences, wherein at least one of the synchronization sequences has a different phase than the other synchronization sequences, comprising correlation means adapted to perform a correlation on the synchronization part, peak detection means adapted to detect candidate correlation peaks in the correlation result, and correlation peak detection means adapted to detect a correlation peak among said candidate correlation peaks on the basis of a confidence value and phase information.

The present invention further suggests a synchronization method for received signals in a wireless communication system, in which the signals are transmitted in frames, each frame comprising a synchronization part with synchronization sequences, wherein at least one of the synchronization sequences has a different phase than the other synchronization sequences, comprising the steps of performing a correlation on the synchronization part, detecting candidate correlation peaks in the correlation result, and detecting a correlation peak among said candidate correlation peaks on the basis of a confidence value and phase information.

The present information therefore suggests to use not only the phase information from the synchronization sequences in the synchronization part of a frame, but also a confidence value in order to enable the receiving apparatus to detect a synchronization peak (i.e. correlation peak) at the end of the synchronization part enabling a correct determination of the beginning of a frame. With beginning of a frame, it is hereby meant that the beginning of the succeeding channel estimation sequences, or the succeeding content data can be determined correctly. The present invention enables significantly enhanced performance of the synchronization, among others in terms of the detection probability, timing accuracy and latency.

Advantageous features are defined in the dependent claims.

Advantageously, the peak detection means is adapted to detect the candidate correlation peaks by determining if the distance between adjacent peaks in the correlation result is equivalent to the length of a synchronization sequence or a multiple thereof. Since the synchronization sequences in the synchronization part of each frame have the respectively identical length (number of symbols), so that a periodical pattern is present, the peak detection means can use this periodic pattern by determining if the peaks which are present in the correlation result have the same periodical structure, i.e. by determining the peaks in the correlation result which have the same distance from each other as the length of a synchronization sequence or a multiple thereof. Such peaks in the correlation result which have a distance from each other which is equivalent to or a multiple of the length of a synchronization sequence are determined as candidate correlation peaks and the other peaks are discarded or ignored.

Hereby, the peak detection means is advantageously adapted to detect the candidate correlation peaks by discarding each lower peak of two adjacent peaks having a distance below the length of a synchronization sequence and by selecting only peaks which have a distance equivalent to the length of a synchronization sequence or a multiple thereof to other peaks as candidate correlation peaks. The correlation result from the correlation means is normally processed in a power calculation means in order to process the correlation result into a power spectrum. The terms "low" and "high" in relation to the peaks are related to the power level of the peaks. As defined, each higher peak of two adjacent peaks which have a distance below the length of a synchronization sequence is selected first, and then the distance between the selected peaks is checked or a periodic structure corresponding to the parallel structure of the synchronization sequences in the synchronization part.

Further advantageously, the correlation peak detection means is adapted to detect a candidate correlation peak as said correlation peak if said confidence value is above a pre-said threshold and if a phase difference between said candidate correlation peak and the preceding candidate correlation peak is present.

Advantageously, the confidence value represents the number of candidate correlation peaks having a distance to the respective preceding candidate correlation peak equivalent to the length of a synchronization sequence or a multiple thereof. Thus, the confidence value represents how many consecutive candidate correlation peaks were detected in the correlation result and will increase with an increasing number of detected peaks. Thus, the confidence value is higher towards the end of a synchronization part when a larger number of candidate correlation peaks were detected. Together with the phase information of the synchronization sequences in relation to each other, it is then possible to detect the correlation peak (synchronization peak) at the end of the synchronization part with a very high reliability.

Advantageously, the correlation peak detection means is adapted to obtain said correlation result from said correlation means and further adapted to obtain said phase information in the correlation result from the correlation means and to calculate the confidence value from the candidate value correlation peaks from the peak detection means. In other words, the correlation peak detection means has two inputs, one input receiving the correlation result from the correlation means and the other input receiving the candidate correlation peaks from the peak detection means.

Further advantageously, the synchronization structure of the present invention comprises delay means adapted to delay the correlation results from the correlation means by one synchronization sequence, adding means adapted to add a negative version of the correlation result from the correlation means and the delayed correlation result from the delay means, and combining means adapted to combine the delayed correlation result from the delay means and the added correlation result from the adding means and to supply the resulting combined correlation result to the peak detection means. This aspect of the present invention provides a synchronization with an even further enhanced performance since the power level of the correlation peak (synchronization peak) will be significantly higher than the power levels of the other candidate correlation peaks in the correlation result. Hereby, it has to be noted that the synchronization structure will comprise power calculation means adapted to provide a power calculation of the delayed correlation result from the delay means and the added correlation result from the adding means so that a peak detection will take place on the basis of a power levels.

Further, it is to be noted that the correlation means of the synchronization structure of the present invention advantageously performs a cross-correlation of the received synchronization part, which normally provides a good correlation performance. However, other correlation types could be performed, such as auto-correlation if desired.

As mentioned, the synchronization structure and method of the present invention provide an enhanced synchronization and specifically enhances the detection probability of the correlation peak in the correlation result (the timing accuracy of the determination of the beginning of the frame as well as the latency). Even when the channel conditions are bad and the signal to noise ratio of the received signals is quite low, the synchronization structure and method of the present invention provide a very good synchronization result due to the use of the periodicity of the synchronization sequences and the specific way in which the correlation peak is determined. Further, the synchronization structure and method of the present invention already provide an accurate determination of the timing and the time position of the correlation peak so that it might not be necessary to implement additional fine synchronization of the frame synchronization.

It is to be noted that the synchronization structure and synchronization method of the present invention can be implemented in any kind of receiving apparatus or any kind of communication system. Thus, the present invention can be implemented in any kind of suitable device, unit, apparatus and so forth if necessary in combination with other features and functionalities necessary for the respective application. For example, the synchronization structure can be realized in any kind of suitable hardware, software or mixture thereof. A receiving apparatus in which the synchronization structure of the present invention would typically be implemented can be any kind of portable, hand-held, stand alone, permanent etc. device adapted to received signals in any kind of wired or wireless communication system. For example, the receiving apparatus could be part of a communication apparatus adapted to receive and transmit signals in the communication system. The wired or wireless communication system can be any kind of suitable communication system based on but not limited to single carrier or multicarrier transmission in which a periodic pattern of the synchronization sequences in the synchronization part of a time frame is used. Further, the term "means" as used throughout the present application is intended to characterize any kind of implementation in functional units adapted to perform the respective functions, such as but not limited to any kind of unit, element, device, eventually in combination with other functionalities and implemented in software, hardware or any kind of suitable mixture thereof.

The present invention will be further explained in more detail in the following description of preferred embodiments in relation to the enclosed drawings, in which.

Figure 4:
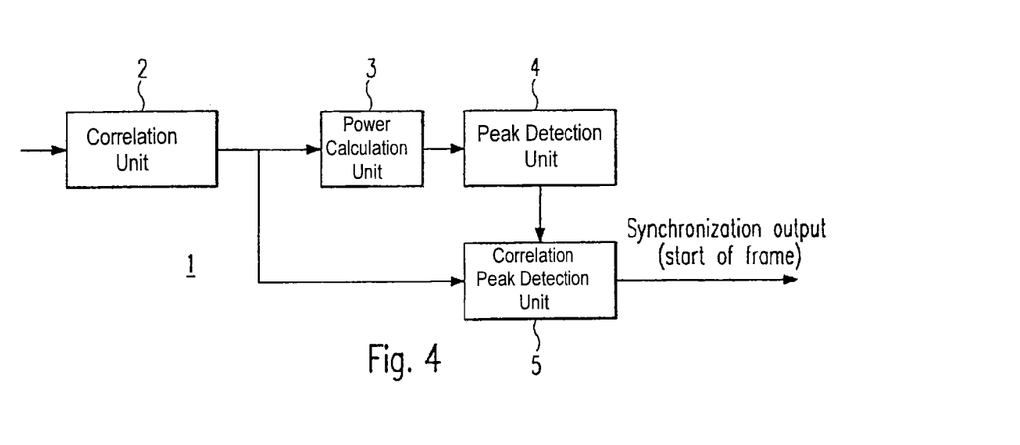
FIG. 4 shows a schematic block diagram of a synchronization structure according to the present invention.

The present invention relates to a synchronization structure and a synchronization method for a receiving apparatus for receiving signals in a wired or wireless communication system. In the following description, the present invention is explained in relation to synchronization structure as shown in FIG. 4 and in FIG. 8. The present invention, however, also relates to a receiving apparatus comprising such receiving structures. In the following description, only elements and functionalities of the receiving structure and the receiving apparatus which are necessary for the understanding of the present invention are explained. However, in practical implementations, the synchronization structure and the receiving apparatus will comprise additional elements and functionalities.

Figure 1:
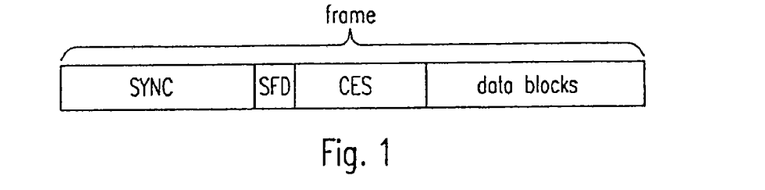
FIG. 1 shows a schematic example of a frame structure.

FIG. 1 shows a schematic example of a temporal frame structure for signals transmitted and received in a communication system in which the synchronization structure and method of the present invention operate. In other words, the content data as well as other necessary data are transmitted on the basis of a burst or packet structure, in which the time domain signals are actually transmitted in frames. An example for such a frame is shown in FIG. 1. As shown, each frame comprises a synchronization part (SYNC) as well as succeeding content data, for example arranged in data blocks. In the example shown in FIG. 1, the synchronization part is followed by a start frame delimiter (SFD), which is followed by a channel estimation sequence (CES), which is then followed by the content data in form of data blocks. The data blocks are typically structured in a way in which segments with content data are separated by guard intervals. It is to be understood that the frame structure of FIG. 1 is only an example and the present invention is not limited to the specific example.

Figure 2:
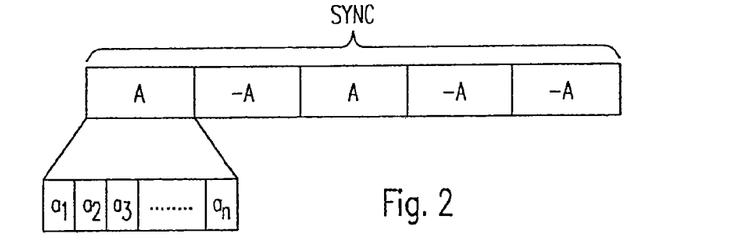
FIG. 2 shows a schematic example of a synchronization part of a frame structure.
Figure 3:
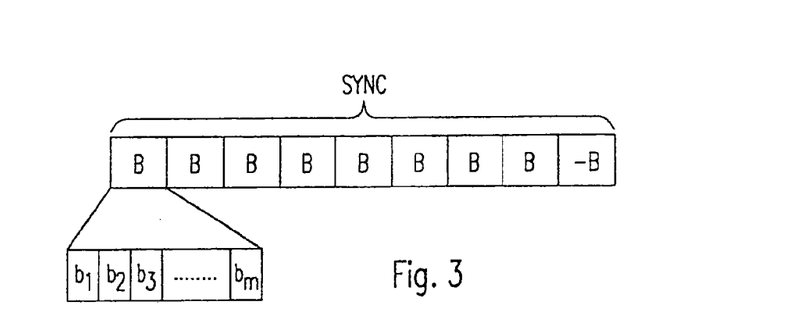
FIG. 3 shows another schematic example of synchronization part of a frame structure.

The synchronization part of the frame structure used in the present invention comprises two or more synchronization sequences, as shown in the schematic examples of FIGS. 2 and 3. In the example of FIG. 2, the synchronization part comprises a plurality of synchronization sequences A, −A. Each synchronization sequence consists of a plurality of samples or symbols, $a_1, a_2, a_3 \ldots a_n$. Hereby, each synchronization sequence consists of the same number of symbols or samples, which from a suitable synchronization sequence with good correlation properties. In other words, each synchronization sequence has the identical number of samples and therefore the identical content, except that some of the synchronization sequences (−A) are phase inverted in relation to the other synchronization sequences (A). Phase inversion hereby means a phase shift or phase rotation by 180°. FIG. 3 shows another example of a synchronization part with a plurality of synchronization sequences B, −B, wherein each synchronization sequence consists of the same and identical number of symbols or samples $b_1, b_2, b_3, \ldots b_m$. Only the last synchronization sequence of the synchronization part is phase inverted (−B) in relation to the preceding synchronization sequences (B). The symbols or samples of the synchronization sequences normally have complex values. It is hereby understood that the synchronization part of the frame structure as used in the present invention could have a different shape and structure from the example as shown in FIGS. 2 and 3. However, the synchronization sequences of the synchronization parts need to have a periodic structure, i.e. a number of synchronization sequences with identical length and identical numbers of samples/symbols. Also, the synchronization part in each frame are located at the very beginning of each frame in order to enable the detection and determination of the frame beginning on a receiving side.

FIG. 4 shows a schematic block diagram of a first embodiment of a synchronization structure 1 of the present invention. The synchronization structure 1 comprises a correlation means 2 which is adapted to perform a correlation on the received synchronization part. For example, the correlation means 2 could be adapted to perform a cross-correlation or a auto-correlation. As a non limiting example, the correlation means 2 could be implemented as a matched filter. When the synchronization structure 1 as shown in FIG. 4 is implemented in a receiving apparatus, the digital samples of the synchronization part which are supplied to the correlation means 2 are for example output from an analog to digital converter adapted to convert the received and down-converted signals into digital samples.

The synchronization structure 1 further comprises a power calculation means 3 which is adapted to perform a power calculation on the correlation result output from the correlation means 2. Hereby, the power calculation means could calculate the power of the correlation result with any suitable scheme, for example $I^2+Q^2$, $|I|+|Q|$, or $\max(|I|, |Q|) + \frac{1}{2} \min(|I|, |Q|)$ or any other suitable power calculation scheme. The correspondingly processed correlation result, i.e. the power values of the correlation result, are then supplied to a peak detection means 4 which is adapted to detect candidate correlation peaks in the correlation result. In other words, the peak detection means 4 is adapted to detect peaks in the correlation result which might qualify as the correlation or synchronization peak which indicates the beginning of the frame.

Figure 5A:
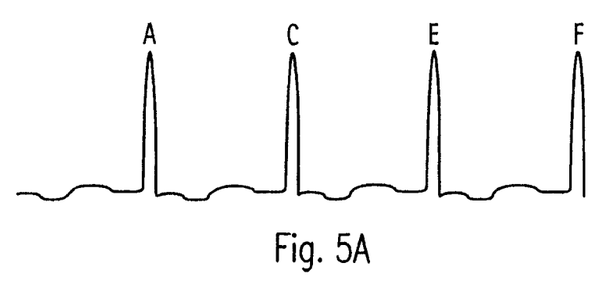
FIGS. 5A, 5B and 5C show schematic diagrams of the peak detection in the correlation results.
Figure 5B:
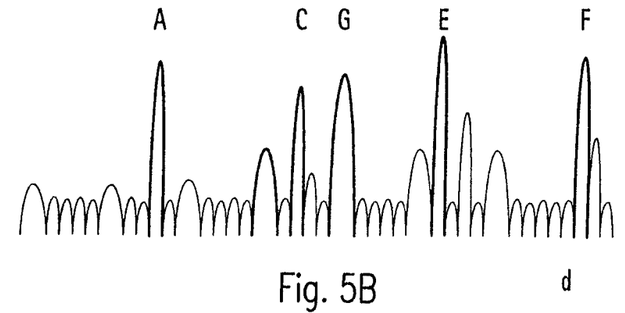
Figure 5C:
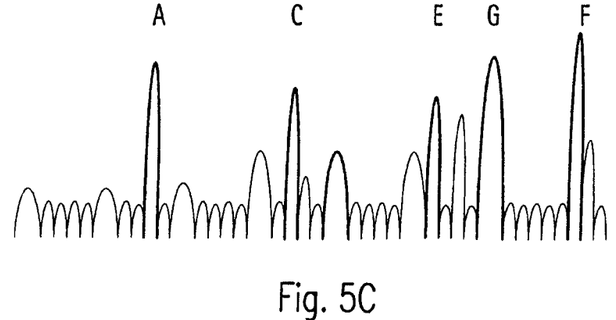

FIGS. 5A, 5B and 5C schematically show examples of an output of the power calculation means 3, i.e. the power scheme of the correlation result for an example in which a synchronization part comprises four synchronization sequences in a periodic pattern, wherein the first three correlation sequences correspond for example to the synchronization sequences B as shown in FIG. 3 and the last correlation sequence is phase inverted, and thus correspond for example to a synchronization sequence −B. As shown in FIG. 5A, an ideal correlation result after the power calculation (without noise) shows four correlation peaks A, C, E, F, wherein the peaks A, C and E result from the synchronization sequences B and the last peak F results from the last synchronization sequence −B. As can be seen, the peaks A, C, E and F are arranged in a periodic pattern with respective identical distances, whereby each distance between adjacent peaks is equivalent to the length of a synchronization sequence.

In the presents of noise, for example caused by a relatively bad channel quality resulting in a low signal to noise ratio, the correlation result deteriorates and shows more peaks or less peaks than the number of original synchronization sequence surprised in the received synchronization part. Examples for such correlation results with noise are shown in FIGS. 5B and 5C.

The peak detection means 4 is adapted to process the received correlation result in a way that candidate correlation peaks, i.e. correlation peaks which might qualify to be determined as the correlation peak or synchronization peak are identified. Hereby, the peak detection means is adapted to detect the candidate correlation peaks by determining if the distance between adjacent peaks in the correlation result is equivalent to the length of a synchronization sequence or a multiple thereof. In the examples of correlation results shown in FIGS. 5B and 5C, five peaks A, C, G, E and F are obtained. The peak detection means 4 is now adapted to detect a candidate correlation peaks by discarding each lower peak of two adjacent peaks having a distance below the length of the synchronization sequence. For example, in the example of FIG. 5B, the peaks C and G are relatively close to each other and their distance is below the length of the synchronization sequence. Peak C is lower than peak G and is therefore discarded, then, the peak detection means 4 is adapted to select only peaks having a distance equivalent to or being a multiple of the length of a synchronization sequence as candidate correlation peaks. In the example of FIG. 5B, the distance between the peaks G and E is below the length of a synchronization sequence. However, the distance between peaks A and E is a multiple of the length of a synchronization sequence (in the shown example two times), and the distance between peak E and F is equivalent to the length of a synchronization sequence. Therefore, peaks A, E and F are selected as candidate correlation peaks.

In relation to the example shown in FIG. 5C, the peak detection means 4 will discard or not select peak E since the distance between peaks E and G is below the length of a synchronization sequence and peak E is lower than peak G. However, since the distance between peak G and peak F is below the length of the synchronization sequence, peak G is also discarded or not selected. However, since the distance between C and peak F is a multiple of a length of the synchronization sequence (two times), peaks C and F are selected. Further, since peaks A and C have a distance equivalent to the length of a synchronization sequence, both peaks A and C are selected. Therefore, in the example of FIG. 5C, peaks A, C and F are selected as candidate correlation peaks by the peak detection means 4.

Figure 6:
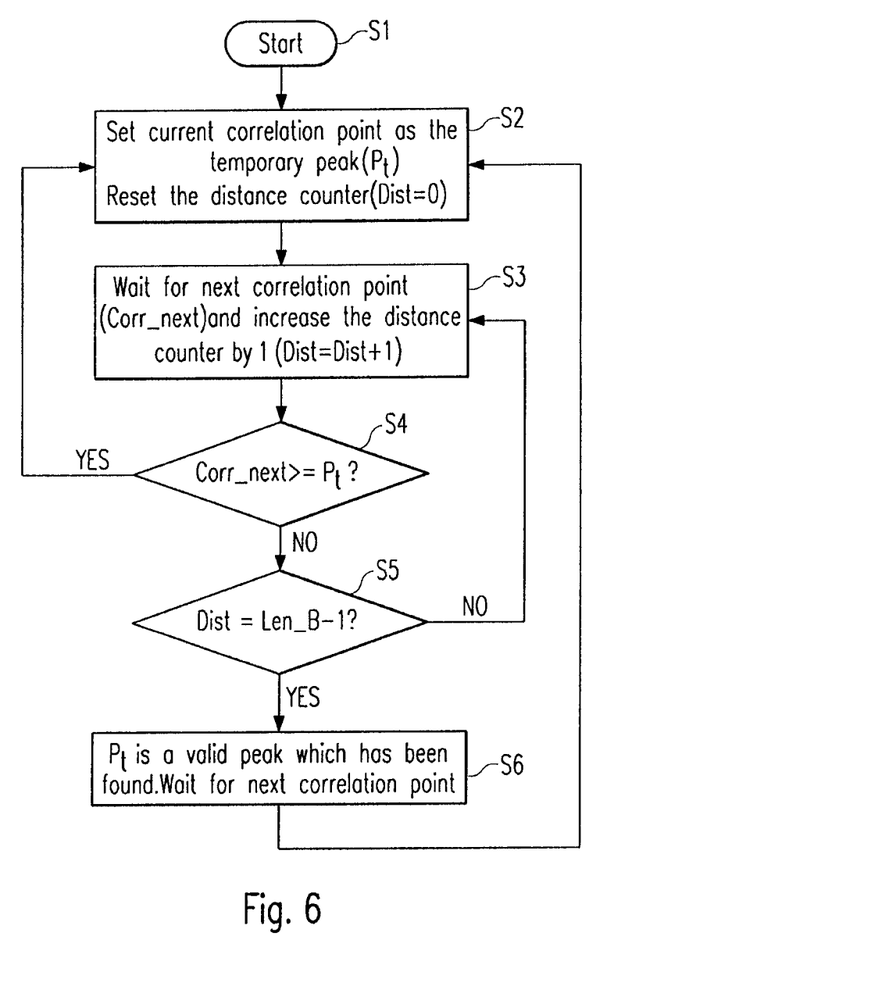
FIG. 6 shows a schematic flowchart of the processing performed in the peak detection mans.

FIG. 6 shows a non-limiting example of a schematic flowchart of the peak detection scheme applied by said peak detection means 4 as explained above. After a start step S1, the peak detection means 4 performs a second step S2 in which the current correlation point (i.e. digital (complex) sample of the power calculated correlation result) is assumed as a temporary peak ($P_t$). At the same time, a distance counter is set to zero (Dist=0). In the following third step S3, the peak detection means 4 detects the next correlation point and increases the distance counter by 1 (Dist=Dist+1). In the fourth step S4, the peak detection means 4 compares if the power value of the next correlation point is larger or equal than the power level of the temporary peak $P_t$. If yes, the processing goes back to the second step S2. If no, the processing proceeds to a fifth step S5 in which the peak detection means 4 compares if the value of the distance counter equals or is equivalent to the length of the synchronization sequence or a multiple thereof. In this implementation example, the peak detection means 4 actually checks if the distance value Dist equals the length of the synchronization sequence which is expressed in "samples−1" (Len_B is the length of a synchronization sequence expressed in the number of symbols or samples, for example n in the example of FIG. 2 and m in the example of FIG. 3). If the comparison result in step S5 results in a negative answer, the processing goes back to the third step S3. If the comparison result in step S5 results in a positive answer, processing continues to a sixth step S6, in which a current peak $B_t$ is detected and selected as a valid candidate constellation peak. Afterwards, the processing goes back to the second processing step S2.

In other words, the peak detection means 4 detects only peaks in the correlation result which have a periodic pattern which corresponds to the periodic pattern of the synchronization sequences in the synchronization part. Peaks which do not match with the periodic pattern or are too low are being discarded or unselected. The peaks which were selected and determined as candidate cancellation peaks in the peak detection means 4 are then forwarded to a correlation peak detection means 5 which is adapted to detect a correlation peak (i.e. synchronization peak) among the candidate correlation peaks on the basis of a confidents value and phase information.

The correlation peak detection means 5 is adapted to receive a correlation result (which is a complex number and thus comprises amplitude and phase information) output from the correlation means 2 directly and also to detect a phase information of the peaks comprised in the correlation result. Hereby, the detected phase information corresponds to the phase of the synchronization sequences of the received synchronization part. If one or more of the synchronization sequences has an inverted phase in relation to the other synchronization sequences as shown in and explained in relation to FIGS. 2 and 3, the peaks resulting from these synchronization sequences in the correlation result will also have inverted phases as compared to the peaks resulting from the other synchronization sequences. In the example of FIG. 5B, the correlation peak detection means 5 will therefore detect that the peak F (which results from the original synchronization sequence −B) will have an inverted phase as compared to the peaks A, C and E (standing from synchronization sequences B).

Figure 7A:
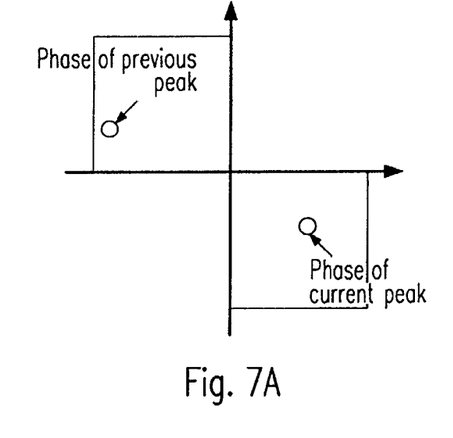
FIGS. 7A, 7B, 7C and 7D show schematic diagrams of the phase detection performed in the correlation peak detection means.
Figure 7B:
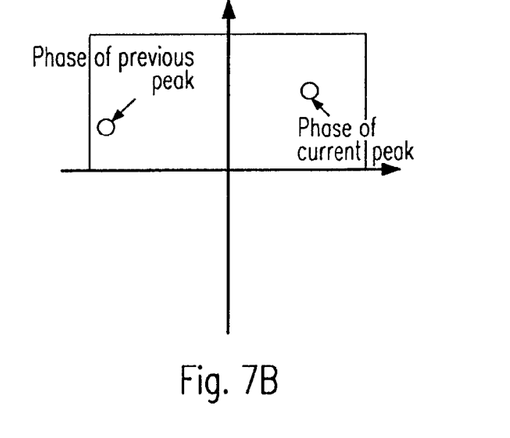
Figure 7C:
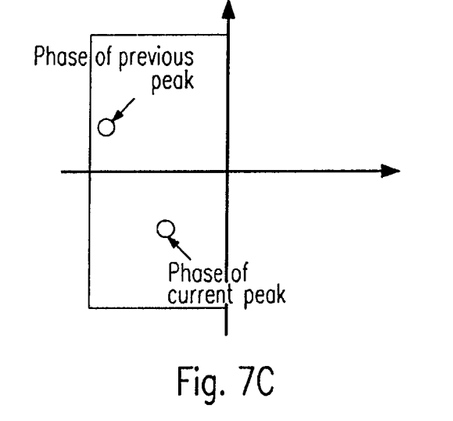
Figure 7D:
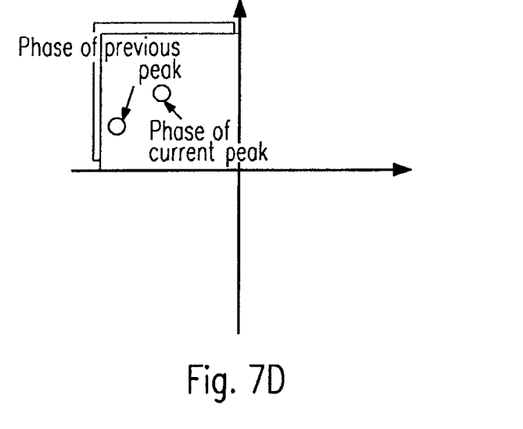

In addition to the phase information of the peaks in the correlation result, the correlation peak detection means 5 additionally uses a confidence value to determine which of the candidate correlation peaks output from the peak detection means 4 is to be selected as the correlation peak. The confidence value hereby represents how many consecutive candidate constellation peak having respective distances being equivalent to or a multiple of the length of a synchronization sequence. Hereby, the correlation peak detection means 5 is adapted to detect a candidate correlation peak as the correlation peak if the confidence value is above a preset threshold and if a phase difference between said candidate correlation peak and the preceding candidate correlation peak(s) is present. The phase difference should ideally be a rotation of the phase by 180°, but might be less than 180° in an actual implementation. FIG. 7A shows an example of a phase rotation of almost 180° between the phase of a current candidate constellation peak and the previous candidate correlation peak and FIGS. 7B, 7C and 7D show examples in which the phase difference between a current candidate constellation peak and the previous candidate constellation peak is not large enough in order to be detected as a phase difference or identifying a candidate constellation peak as the constellation peak. Hereby, the phase difference could also be detected using a preset threshold value.

The calculation of the confidence value in the correlation peak detection means 5 could be implemented by increasing the confidence value each time when it is detected that the distance between consecutive candidate constellation peaks is equivalent to or a multiple of the length of a synchronization sequence. Then, after a certain predefined number of candidate constellation peaks have been detected so that the confidence value has reached a certain preset threshold and at the same time if a phase difference between a candidate constellation peak and the preceding candidate constellation peak which is large enough to qualify to be detected as a phase inversion is detected, the present candidate constellation peak is detected to be the constellation peak. In the example of FIG. 5B, the confidence value could be increased when detecting the candidate constellation peak E having a distance to the preceding candidate constellation peak A of two times the length of a synchronization sequence. The confidence value is further increased when detecting the candidate constellation peak F having a distance to the proceeding candidate constellation peak E of the length of the synchronization sequence and at the same time detecting that the phase of the candidate constellation peak F is (almost) inverted as compared to the phase of the preceding candidate constellation peak E (FIG. 7A). Then, the candidate constellation peak F would be detected as the constellation peak to be used to detect the beginning of a frame. More specifically, the constellation peak position could be used to detect the start position of the succeeding channel estimation sequence in a frame or the position of a succeeding data content block.

The present invention suggests thus to detect the cross correlation peak by searching through the cross correlation results utilizing the periodicity of the preamble. This method is very robust e.g. in cases where the input SNR is low or the input signal power is changing.

Figure 8:
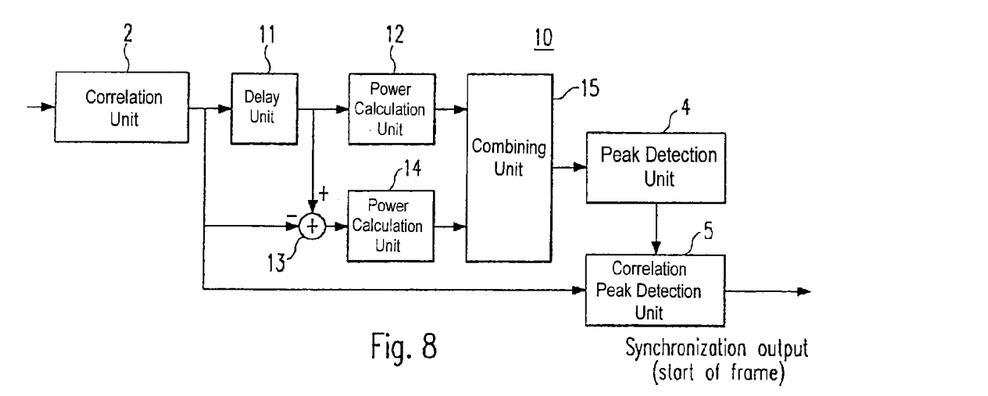
FIG. 8 shows a schematic block diagram of another embodiment of a synchronization structure of the present invention.

FIG. 8 shows a schematic block diagram of another embodiment of a synchronization structure 10 of the present invention. The functional units of the synchronization structure 10 shown in FIG. 8 which are identical to the corresponding functional units of the synchronization structure 1 shown in FIG. 4 are identified with the same reference numerals. For example, the correlation means 2, the peak detection means 4 as well as the correlation peak detection means 5 of the synchronization structure 10 of FIG. 8 are identical to the respective elements of the synchronization structure 1 in FIG. 4. All explanations above made in relation to these functional units as well as the channel functionality of the synchronization structure 1 made above are also true in relation to the synchronization structure 10 shown in FIG. 8. However, the synchronization structure 10 comprises some additional functional units which are intended to further enhance the synchronization performance.

Figure 9:
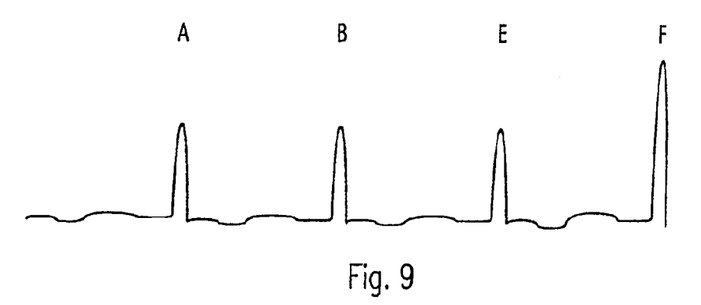
FIG. 9 shows a schematic diagram of the peak detection in a correlation result as performed in the detection means of FIG. 8.

The synchronization part with synchronization sequences are correlated in the correlation means 2 as explained above. Then, the correlation result is supplied to a delay means 11 which is adapted to delay the correlation result by the length of one single synchronization sequence (Len_B). As explained above, Len_B represents the length of a synchronization sequence impressed in the number of the symbols or samples contained therein (n in case of the example of FIG. 2 and m in the case of the example of FIG. 3). Then, the delayed correlation result is applied to a adding means 13 which is adapted to add (a positive version of) the delayed correlation result and (a negative version of) the correlation result received directly from the correlation means 2. The adding means 13 therefore performs an adding operation which is a complex operation in case that the received signals are complex samples. The result of the adding operation, i.e. the added correlation result is supplied to a power calculation means 14 adapted to perform a power calculation on the added correlation result. Further, the delayed correlation result output from the delay means 11 is not only supplied by the adding means 13 but also supplied to a further power calculation means 12 which performs a power calculation on the delayed correlation result. The power calculation means 12 and the power calculation means 14 perform a power calculation in the same way as explained in relation to the operation of the power calculation means 3 of the synchronizing structure 1 shown in FIG. 4. The power calculated delayed correlation result output from the power calculation means 12 and the power calculated added correlation result output from a power calculation means 14 are both supplied to a combining means 15 which is adapted to combine the delayed correlation result and the added correlation result to a correlation result with an improved liability and accuracy as compared to the correlation result output by the power calculation means 3 of the synchronization structure 1 of FIG. 4. An example for such an improved correlation result obtained by the combining means 15 is shown in the schematic diagram of FIG. 9 which shows the improved correlation result without the noise. As can be seen, the last peak F which results from the correlation of a synchronization sequence (−B) having an inverted phase as compared as the other synchronization sequences (B) has a much higher (two times higher) power level as the other peaks A, B and E. It has to be understood that the example shown in FIG. 9 also basis on a synchronization part having four synchronization sequences, whereby the first three synchronization sequences have the shape B and the last synchronization sequence has the shape −B as explained above in relation to FIG. 4. Thus, it can be seen from FIG. 9 that the addition of the delay means 11, the adding means 13 and the combining means 15 essentially results in a correlation result in which the peaks resulting from synchronization sequences having an inverted phase as compared in the peaks which result from a synchronization sequences having a normal phase have a much higher power level so that a much more reliable detection of these last correlation peaks is possible with the synchronization structure 10 of FIG. 8. The functionalities of the peak detection means 4 to which the improved correlation result is supplied to from the combining means 15 as well as the correlation peak detection means 5 are identical to the functionalities explained in detail in relation to FIG. 4.

The present invention therefore provides a synchronization structure and method with a significantly enhanced performance, specifically in view of detection probability, timing accuracy, false alarm probability and so forth, specifically in environments with a low signal to noise ratio. Further, architecture of the synchronization structure of the present invention and the processing steps of the synchronization method are relatively simple as compared to the prior art.

The invention claimed is:

1. A synchronization structure for a receiving apparatus for receiving signals in a communication system, in which the signals are transmitted in frames, each frame including a synchronization part with synchronization sequences, wherein at least one of the synchronization sequences has a different phase than the other synchronization sequences, the synchronization structure comprising:
   a correlation unit configured to perform a correlation on the synchronization part;
   a peak detection unit configured to detect candidate correlation peaks in the correlation result, wherein the peak detection unit detects the candidate correlation peaks only when a distance between adjacent peaks in the correlation result is equivalent to the length of a synchronization sequence or a multiple thereof; and
   a correlation peak detection unit configured to detect a correlation peak among said candidate correlation peaks on the basis of a confidence value and phase information.

2. The synchronization structure according to claim 1, wherein said peak detection unit is further configured to detect said candidate correlation peaks by discarding each lower peak of two adjacent peaks having a distance below the length of a synchronization sequence and by selecting only peaks which have a distance equivalent to the length of a synchronization sequence or a multiple thereof to other peaks as candidate correlation peaks.

3. The synchronization structure according to claim 1, wherein said correlation peak detection unit is further configured to detect a candidate correlation peak as said correlation peak if said confidence value is above a preset threshold and if a phase difference between said candidate correlation peak and the preceding candidate correlation peak is greater than a predetermined phase amount.

4. The synchronization structure according to claim 1, wherein the confidence value represents the number of candidate correlation peaks having a distance to the respective preceding candidate correlation peak equivalent to the length of a synchronization sequence or a multiple thereof.

5. The synchronization structure according to claim 1, wherein said correlation peak detection unit is configured to obtain said correlation result from said correlation unit and further configured to obtain said phase information from the correlation result from the correlation unit and to calculate the confidence value from the candidate correlation peaks obtained from the peak detection unit.

6. The synchronization structure according to claim 1, further comprising:
   a delay unit configured to delay the correlation result from the correlation unit by one synchronization sequence;

an adding unit configured to add a negative version of the correlation result from the correlation unit and the delayed correlation result from the delay unit; and a combining unit configured to combine the delayed correlation result from the delay unit and the added correlation result from the adding unit and to supply the resulting combined correlation result to the peak detection unit.

7. A synchronization method for received signals in a communication system, in which the signals are transmitted in frames, each frame including a synchronization part with synchronization sequences, wherein at least one of the synchronization sequences has a different phase than the other synchronization sequences, the synchronization method comprising the steps of:

performing a correlation on the synchronization part;

detecting candidate correlation peaks in the correlation result only when the distance between adjacent peaks in the correlation result is equivalent to the length of a synchronization sequence or a multiple thereof; and detecting a correlation peak among said candidate correlation peaks based on a confidence value and phase information.

8. The synchronization method according to claim 7, wherein said candidate correlation peaks are detected by discarding each lower peak of two adjacent peaks having a distance below the length of a synchronization sequence and by selecting only peaks which have a distance equivalent to the length of a synchronization sequence or a multiple thereof to other peaks as candidate correlation peaks.

9. The synchronization method according to claim 7, wherein a candidate correlation peak is detected as said correlation peak if said confidence value is above a preset threshold and if a phase difference between said candidate correlation peak and the preceding candidate correlation peak is greater than a predetermined phase amount.

10. The synchronization method according to claim 7, wherein the confidence value represents the number of candidate correlation peaks having a distance to the respective preceding candidate correlation peak equivalent to the length of a synchronization sequence or a multiple thereof.

11. The synchronization method according to claim 7, wherein in said correlation peak detecting step said correlation result is obtained from said correlation step, said phase information is obtained from the correlation result from the correlation step and the confidence value is calculated from the candidate correlation peaks from the peak detection step.

12. The synchronization method according to claim 7, further comprising:

delaying the correlation result from the correlation step by one synchronization sequence;

adding a negative version of the correlation result from the correlation step and the delayed correlation result from the delay step; and combining the delayed correlation result from the delay step and the added correlation result from the adding step and supplying the resulting combined correlation result to the peak detection step.

13. A synchronization structure for a receiving apparatus for receiving signals in a communication system, in which the signals are transmitted in frames, each frame including a synchronization part with synchronization sequences, wherein at least one of the synchronization sequences has a different phase than the other synchronization sequences, the synchronization structure comprising:

a correlation unit configured to perform a correlation on the synchronization part;

a peak detection unit configured to detect candidate correlation peaks in the correlation result;

a correlation peak detection unit configured to detect a correlation peak among said candidate correlation peaks on the basis of a confidence value and phase information;

a delay unit configured to delay the correlation result from the correlation unit by one synchronization sequence;

an adding unit configured to add a negative version of the correlation result from the correlation unit and the delayed correlation result from the delay unit; and a combining unit configured to combine the delayed correlation result from the delay unit and the added correlation result from the adding unit and to supply the resulting combined correlation result to the peak detection unit.

* * * * *